US009133342B2

(12) United States Patent
Walden et al.

(10) Patent No.: US 9,133,342 B2
(45) Date of Patent: Sep. 15, 2015

(54) PREPARATION OF HIGHLY PERMEABLE, SUPERABSORBENT POLYMER STRUCTURES

(75) Inventors: Mirko Walden, Herten (DE); Rainer Teni, Moers (DE); Armin Reimann, Willich (DE); Harald Schmidt, Tonisvorst (DE)

(73) Assignee: Evonik Degussa GmbH, Essen (DE)

( * ) Notice: Subject to any disclaimer, the term of this patent is extended or adjusted under 35 U.S.C. 154(b) by 1115 days.

(21) Appl. No.: 12/297,480

(22) PCT Filed: Apr. 20, 2007

(86) PCT No.: PCT/EP2007/003483
§ 371 (c)(1),
(2), (4) Date: Jan. 5, 2009

(87) PCT Pub. No.: WO2007/121941
PCT Pub. Date: Nov. 1, 2007

(65) Prior Publication Data
US 2009/0105389 A1 Apr. 23, 2009

(30) Foreign Application Priority Data
Apr. 21, 2006 (DE) .......................... 10 2006 019 157

(51) Int. Cl.
*C08L 101/14* (2006.01)
*C08K 3/08* (2006.01)
*C08G 65/14* (2006.01)

(52) U.S. Cl.
CPC .................................. *C08L 101/14* (2013.01)

(58) Field of Classification Search
CPC ........ C08L 101/14; C08K 3/08; C08G 65/14; C08F 8/44
See application file for complete search history.

(56) References Cited

U.S. PATENT DOCUMENTS

| | | | |
|---|---|---|---|
| 4,076,663 A | 2/1978 | Masuda et al. | |
| 4,131,576 A | 12/1978 | Iovine et al. | |
| 4,179,367 A | 12/1979 | Barthell et al. | |
| 4,340,706 A | 7/1982 | Obayashi et al. | |
| 4,587,308 A | 5/1986 | Makita et al. | |
| 4,857,610 A | 8/1989 | Chmelir et al. | |
| 4,893,999 A | 1/1990 | Chmelir et al. | |
| 5,409,771 A | 4/1995 | Dahmen et al. | |
| 5,429,628 A * | 7/1995 | Trinh et al. | 604/359 |
| 5,589,256 A * | 12/1996 | Hansen et al. | 442/417 |
| 5,610,220 A | 3/1997 | Klimmek et al. | |
| 5,672,633 A | 9/1997 | Brehm et al. | |
| 5,712,316 A | 1/1998 | Dahmen et al. | |
| 5,973,042 A * | 10/1999 | Yoshinaga et al. | 524/192 |
| 6,060,557 A | 5/2000 | Dahmen et al. | |
| 6,323,252 B1 * | 11/2001 | Gartner et al. | 521/149 |
| 6,403,700 B1 | 6/2002 | Dahmen et al. | |
| 6,605,673 B1 | 8/2003 | Mertens et al. | |
| 7,037,590 B2 | 5/2006 | Rische et al. | |
| 7,169,843 B2 | 1/2007 | Smith et al. | |
| 7,179,862 B2 | 2/2007 | Mertens et al. | |
| 7,541,395 B2 | 6/2009 | Reimann et al. | |
| 7,638,570 B2 | 12/2009 | Torii et al. | |
| 7,795,345 B2 | 9/2010 | Smith et al. | |
| 7,833,624 B2 | 11/2010 | Harren et al. | |
| 7,842,386 B2 | 11/2010 | Loeker et al. | |
| 7,893,134 B2 | 2/2011 | Reimann et al. | |
| 8,003,728 B2 | 8/2011 | Riegel et al. | |
| 8,247,491 B2 | 8/2012 | Torii et al. | |
| 8,288,002 B2 | 10/2012 | Loeker et al. | |
| 8,466,228 B2 | 6/2013 | Smith et al. | |
| 8,518,541 B2 | 8/2013 | Loeker et al. | |
| 2003/0138640 A1 | 7/2003 | Rische et al. | |
| 2003/0207997 A1 | 11/2003 | Mertens et al. | |
| 2004/0019342 A1 * | 1/2004 | Nagasuna et al. | 604/385.01 |
| 2004/0214946 A1 * | 10/2004 | Smith et al. | 524/556 |
| 2004/0231065 A1 * | 11/2004 | Daniel et al. | 8/405 |
| 2005/0113252 A1 * | 5/2005 | Miyake et al. | 502/402 |
| 2005/0245684 A1 * | 11/2005 | Daniel et al. | 525/178 |
| 2006/0029782 A1 * | 2/2006 | Harren et al. | 428/212 |

(Continued)

FOREIGN PATENT DOCUMENTS

CN 1708542 12/2005
DE 2706135 A1 8/1978

(Continued)

OTHER PUBLICATIONS

PEG website from Sigma Aldrich (2014).*
English Translation of Written Opinion mailed on Mar. 17, 2009 in PCT/EP2007/003483.
Franck Furno et al., U.S. Appl. No. 11/912,011, filed Oct. 19, 2007.
International Preliminary Report on Patentability mailed on Mar. 17, 2009 in PCT/EP2007/003483.
Buchholz, Frederick L. and Graham, Andrew T., "Modern Superabsorbent Polymer Technology," copyright 1998, John Wiley & Sons, Inc., Chapter 1: "Absorbency and Superabsorbency," pp. 1-17 (19 pages).

(Continued)

*Primary Examiner* — Mark Kaucher
(74) *Attorney, Agent, or Firm* — Philip P. McCann; John P. Zimmer; Smith Moore Leatherwood LLP

(57) ABSTRACT

The present invention relates to a superabsorber composition comprising
an at least surface-crosslinked, water-absorbing polymer structure having a structure surface,
a large number of fine particles at least partly immobilized on the structure surface.
The invention furthermore relates to a process for the preparation of a superabsorber composition, the superabsorber composition obtainable by this process, a composite comprising the superabsorber composition according to the invention, a process for the production of a composite, the composite obtainable by this process, the use of the superabsorber composition according to the invention in chemical products and chemical products comprising the superabsorber composition according to the invention or the composite according to the invention.

15 Claims, No Drawings

(56) References Cited

U.S. PATENT DOCUMENTS

| | | |
|---|---|---|
| 2006/0057389 A1 | 3/2006 | Reimann et al. |
| 2006/0073969 A1* | 4/2006 | Torii et al. .................. 502/400 |
| 2007/0066754 A1 | 3/2007 | Loeker et al. |
| 2007/0129495 A1 | 6/2007 | Mertens et al. |
| 2008/0221277 A1* | 9/2008 | Walden et al. ................ 525/418 |
| 2008/0280128 A1 | 11/2008 | Furno et al. |

FOREIGN PATENT DOCUMENTS

| | | |
|---|---|---|
| DE | 2840010 | 6/1979 |
| DE | 3503458 A1 | 8/1985 |
| DE | 3544770 A1 | 6/1987 |
| DE | 3713601 A1 | 11/1988 |
| DE | 4020780 C1 | 8/1991 |
| DE | 4244548 A1 | 7/1994 |
| DE | 4418818 A1 | 1/1995 |
| DE | 4333056 A1 | 3/1995 |
| DE | 19518645 C1 | 9/1996 |
| DE | 19529348 A1 | 2/1997 |
| DE | 19909653 A1 | 9/2000 |
| DE | 19909838 A1 | 9/2000 |
| DE | 10249821 A1 | 5/2004 |
| DE | 10334286 B4 | 1/2006 |
| DE | 102005018923 A1 | 10/2006 |
| EP | 0233067 B1 | 4/1990 |
| EP | 1312421 A2 | 5/2003 |
| EP | 1616581 A1 | 1/2006 |
| JP | H11286611 | 10/1999 |
| JP | 2005097519 | 4/2005 |
| JP | 2006526691 | 11/2006 |
| JP | 2007530752 | 11/2007 |
| WO | 9522356 A1 | 8/1995 |
| WO | 9605234 A1 | 2/1996 |
| WO | 9848857 A1 | 11/1998 |
| WO | 9849221 A1 | 11/1998 |
| WO | 9934843 A1 | 7/1999 |
| WO | 9955767 A1 | 11/1999 |
| WO | 0141818 A1 | 6/2001 |
| WO | 0142339 A1 | 6/2001 |
| WO | 02056812 A2 | 7/2002 |
| WO | WO 2004024816 A1 * | 3/2004 ............. C08L 39/02 |
| WO | 2004037903 A2 | 5/2004 |
| WO | 2004069293 A1 | 8/2004 |
| WO | 2004069915 A2 | 8/2004 |
| WO | 2004113452 A1 | 12/2004 |
| WO | 2005011860 A2 | 2/2005 |
| WO | 2005027986 A1 | 3/2005 |
| WO | 2006111402 A2 | 10/2006 |
| WO | 2006111403 A1 | 10/2006 |
| WO | WO 2006111402 A2 * | 10/2006 ............. A61L 15/18 |
| WO | WO 2006111403 A1 * | 10/2006 |
| WO | WO 2006111404 A2 * | 10/2006 ............. A61L 15/18 |

OTHER PUBLICATIONS

Buchholz, Frederick L. and Graham, Andrew T., "Modern Superabsorbent Polymer Technology," copyright 1998, John Wiley & Sons, Inc., Chapter 2: "Chemistry of Superabsorbent Polyacrylates," pp. 19-67 (51 pages).

Buchholz, Frederick L. and Graham, Andrew T., "Modern Superabsorbent Polymer Technology," copyright 1998, John Wiley & Sons, Inc., Chapter 3: "Commercial Processes for the Manufacture of Superabsorbent Polymers," pp. 69-117 (51 pages).

Buchholz, Frederick L. and Graham, Andrew T., "Modern Superabsorbent Polymer Technology," copyright 1998, John Wiley & Sons, Inc., Chapter 4: "Analysis and Characterization of Superabsorbent Polymers," pp. 119-165 (49 pages).

Buchholz, Frederick L. and Graham, Andrew T., "Modern Superabsorbent Polymer Technology," copyright 1998, John Wiley & Sons, Inc., Chapter 5: "The Structure and Properties of Superabsorbent Polyacrylates," pp. 167-221 (57 pages).

* cited by examiner

PREPARATION OF HIGHLY PERMEABLE, SUPERABSORBENT POLYMER STRUCTURES

This application is a national stage application under 35 U.S.C. 371 of international application No. PCT/EP2007/003483 filed 20 Apr. 2007, and claims priority to German Application No. DE 10 2006 019 157.9 filed 21 Apr. 2006, the disclosure of which is expressly incorporated herein by reference.

BACKGROUND

The present invention relates to a superabsorber composition, a process for the preparation of a superabsorber composition, the superabsorber composition obtainable by this process, a composite comprising the superabsorber composition according to the invention, a process for the production of a composite, the composite obtainable by this process, the use of the superabsorber composition according to the invention in chemical products, and chemical products comprising the superabsorber composition according to the invention or the composite according to the invention.

Superabsorbers generally are water-insoluble, crosslinked polymers that are capable of taking up, with swelling and formation of hydrogels, large amounts of water and aqueous liquids, in particular body fluids, such as urine or blood, and of retaining them under pressure. Superabsorbers absorb preferably at least 100 times their own weight of water. Further details of superabsorbers are disclosed in "*Modern Superabsorbent Polymer Technology*", F. L. Buchholz, A. T. Graham, Wiley-VCH, 1998". Due to these characteristic properties, these water-absorbing polymers are mainly incorporated into sanitary articles, such as, for example, baby diapers, incontinence products, or sanitary towels.

The superabsorbers commercially available are substantially crosslinked polyacrylic acids or crosslinked starch/acrylic acid graft polymers in which the carboxyl groups may be partly neutralized with sodium hydroxide solution or potassium hydroxide solution. These may be obtainable by subjecting monomeric acrylic acid or salts thereof to free-radical polymerization in the presence of suitable crosslinking agents. Various polymerization processes may be used in this context, such as, for example, solution polymerization, emulsion polymerization, or suspension polymerization. Water-absorbing polymers in particulate form may be obtained from these processes and have a particle diameter in a range of from 150 to 850 µm, and may be incorporated into the sanitary articles.

In order to improve the absorbency of the water-absorbing polymers under a pressure load, the carboxylate groups in the surface region are post-crosslinked to form a core-shell structure. It is thus known, for example, from DE-A-40 20 780 to react the water-absorbing polymers with alkylene carbonates, which may react with the carboxyl groups of the polymers.

For aesthetic reasons and from environmental aspects, there is an increasing tendency to make hygiene articles, such as baby diapers, incontinence products, and sanitary towels, in which the water-absorbing polymers described above, are conventionally employed in the form of fibers or particles, ever smaller and thinner. In order to ensure a constant overall retention capacity of the sanitary articles, this requirement may be met only by reducing the content of large-volume fluff. As a result, further tasks in respect of transportation and distribution of liquids, which may be summarized collectively as permeability properties, fall to the water-absorbing polymers.

In superabsorber materials, permeability may be understood as meaning the ability to transport and to distribute three-dimensionally, in the swollen state, added liquids. In the swollen polymer gel, this process proceeds via capillary transportation through intermediate spaces between the gel particles. A transportation of liquid through swollen polymer particles itself follows the laws of diffusion and is a very slow process which, in the situation in which the sanitary article is used, plays no role in distribution of the liquid.

The surface post-crosslinking described above indeed has the effect of improving the absorption under a pressure load, because the known phenomenon of "gel blocking", in which swollen polymer particles stick together and further uptake of liquid is thereby prevented, is counteracted by the post-crosslinking. Nevertheless, surface post-crosslinking alone does not generally lead to an improvement in the interparticulate transportation of liquid and therefore permeability.

To increase the permeability, it is known from the prior art, for example, to carry out the surface post-crosslinking in the presence of cations, in particular in the presence of aqueous aluminum salt solutions, such as is described, for example, in DE-A-199 09 838. DE-A-102 49 821 proposes addition of an inorganic sol, for example silica sol, during the surface post-crosslinking in order to improve the permeability of the water-absorbing polymers.

A disadvantage of the post-treatment processes known from the prior art is that these indeed lead to an improvement in the permeability properties, but at the same time also have the effect of an often significant deterioration in the absorption properties under pressure.

An object of the present invention is to reduce or overcome the disadvantages resulting from the prior art.

In particular, the present invention was based on the object of providing a process for the preparation of water-absorbing polymers that have, in particular on incorporation into absorbent structures of high polymer content, the lowest possible "gel blocking" effect, and of distributing as quickly and as uniformly as possible liquids penetrating into the absorbent structure.

The present invention was also based on the object of providing a process with which water-absorbing polymers having the advantageous properties described above may be prepared in a simple manner.

The present invention was also based on the object of providing a composite which as far as possible shows no "gel blocking" affect and furthermore is capable of distributing rapidly and uniformly within the composite liquids penetrating into the composite.

SUMMARY

A contribution towards achieving the abovementioned objects is made by a superabsorber composition comprising
  a surface-crosslinked, water-absorbing polymer structure having a structure surface, and
  a large number of fine particles at least partly immobilized on the structure surface.

The water-absorbing polymer structure post-crosslinked on the surface which is contained in the superabsorber composition according to the invention may be a fiber, a foam, or a particle, or fibers.

Polymer fibers may have dimensions such that they may be incorporated into, or as yarns for textiles, and also directly into textiles. The polymer structures may be in the form of polymer fibers having a length in a range of from about 1 to about 500 mm, or from about 2 to about 500 mm, or from about 5 to about 100 mm, and a diameter in a range of from about 1 to about 200 denier, or from about 3 to about 100 denier, or from about 5 to about 60 denier.

Polymer particles according to the present invention may have dimensions such that they may have an average particle size in accordance with ERT 420.2-02 in a range of from about 10 to about 3,000 µm, or from about 20 to about 2,000 µm, or from about 150 to about 850 µm or from about 150 to about 600 µm. The content of polymer particles may have a particle size in a range of from about 300 to about 600 µm to be at least about 30 wt %, or at least about 40 wt %, or at least about 50 wt %, based on the total weight of the post-crosslinked, water-absorbing polymer particles.

Numerous other embodiments, features, and advantages of the present invention will appear from the following description. In the description, reference is made to exemplary embodiments of the invention. Such embodiments do not represent the full scope of the invention. Reference should therefore be made to the claims herein for interpreting the full scope of the invention. In the interest of brevity and conciseness, any ranges of values set forth in this specification contemplate all values within the range and are to be construed as support for claims reciting any sub-ranges having endpoints which are real number values within the specified range in question. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

DESCRIPTION

In an embodiment of the superabsorber composition comprises water-absorbing polymer structures comprise ($\alpha$1) from about 20 to about 99.999 wt %, or from about 55 to about 98.99 wt %, or from about 70 to about 98.79 wt % of polymerized, ethylenically unsaturated monomers carrying acid groups, or salts thereof, or polymerized, ethylenically unsaturated monomers containing a protonated or quaternized nitrogen, or mixtures thereof, mixtures comprising at least ethylenically unsaturated monomers containing acid groups, such as acrylic acid;

($\alpha$2) from 0 to about 80 wt %, or from 0 to about 44.99 wt %, or from about 0.1 to about 44.89 wt % of polymerized, monoethylenically unsaturated monomers that may be copolymerized with component ($\alpha$1);

($\alpha$3) from about 0.001 to about 5 wt %, or from about 0.01 to about 3 wt %, or from about 0.01 to about 2.5 wt % of one or more crosslinking agents;

($\alpha$4) from 0 to about 30 wt %, or from 0 to about 5 wt %, or from about 0.1 to about 5 wt % of a water-soluble polymer;

($\alpha$5) from 0 to about 20 wt %, or from 2.5 to about 15 wt %, or from about 3 to about 10 wt % of water; and ($\alpha$6) from 0 to about 20 wt %, or from 0 to about 10 wt %, or from about 0.1 to about 8 wt % of one or more auxiliaries, the sum of the amounts by weight of components ($\alpha$1) to ($\alpha$6) being 100 wt. %.

The monoethylenically unsaturated monomers ($\alpha$1) carrying acid groups may be partly or completely neutralized. The monoethylenically unsaturated monomers containing acid groups may be neutralized to the extent of at least about 25 mol %, or to the extent of at least about 50 mol %, or to the extent of about 50 to about 80 mol %. Reference is made in this connection to DE 195 29 348 A1 for information. The neutralization may also take place partly or completely after the polymerization. The neutralization may be carried out with alkali metal hydroxides, alkaline earth metal hydroxides, ammonia, and carbonates and bicarbonates. In addition, any further base which forms a water-soluble salt with the acid may be conceivable. Mixed neutralization with various bases is also conceivable. Neutralization with ammonia and alkali metal hydroxides may be used.

The free acid groups may predominate in a polymer, so that the polymer has a pH in the acidic range. This acidic water-absorbing polymer may be at least partly neutralized by a polymer with free basic groups, such as amine groups, which are basic in comparison with the acidic polymer. These polymers are called mixed-bed ion exchange absorbent polymers (MBIEA polymers) in the literature and are disclosed, inter alia, in WO 99/34843 A1. Generally, MBIEA polymers are a composition which comprises basic polymers that are capable of exchanging anions, and a polymer that is acidic in comparison with the basic polymer, and is capable of exchanging cations. The basic polymer contains basic groups and may be typically obtained by polymerization of monomers which carry basic groups or groups which may be converted into basic groups. These monomers may include those that contain primary, secondary, or tertiary amines, or the corresponding phosphines or at least two of the above functional groups. This group of monomers includes, in particular, ethyleneamine, allylamine, diallylamine, 4-aminobutene, alkyloxycyclins, vinylformamide, 5-aminopentene, carbodiimide, formaldacin, melamine and the like, and secondary or tertiary amine derivatives thereof.

Ethylenically unsaturated monomers ($\alpha$1) carrying acid groups may include those compounds which are mentioned as ethylenically unsaturated monomers ($\alpha$1) carrying acid groups in WO 2004/037903 A2, which is introduced herewith as reference and thus forms part of the disclosure only to the extent of compounds that are mentioned as ethylenically unsaturated monomers. Ethylenically unsaturated monomers ($\alpha$1) carrying acid groups may be acrylic acid or methacrylic acid.

According to one embodiment of the present invention, water-absorbing polymer structures in which the monoethylenically unsaturated monomers ($\alpha$2) which may be copolymerized with ($\alpha$1) are acrylamides, methacrylamides, or vinylamides.

Examples of (meth)acrylamides include, in addition to acrylamide and methacrylamide, alkyl-substituted (meth) acrylamides or aminoalkyl-substituted derivatives of (meth) acrylamide, such as N-methylol(meth)acrylamide, N,N-dimethylamino(meth)acrylamide, dimethyl(meth)acrylamide or diethyl(meth)acrylamide. Possible vinylamides are, for example include N-vinylamides, N-vinylformamides, N-vinylacetamides, N-vinyl-N-methylacetamides, N-vinyl-N-methylformamides and vinylpyrrolidone. Acrylamide may be used.

According to another embodiment of the present invention, water-absorbing polymer structures in which the monoethylenically unsaturated monomers ($\alpha$2) which may be copolymerized with ($\alpha$1) are water-soluble monomers may be employed. In this connection, alkoxypolyalkylene oxide (meth)acrylates, such as methoxypolyethylene glycol(meth) acrylates, may be used.

Water-dispersible monomers may used as monoethylenically unsaturated monomers ($\alpha$2) which may be copolymerized with ($\alpha$1). Water-dispersible monomers may include acrylic acid esters and methacrylic acid esters, such as methyl (meth)acrylate, ethyl(meth)acrylate, propyl(meth)acrylate or butyl(meth)acrylate.

The monoethylenically unsaturated monomers ($\alpha$2) which may be copolymerized with ($\alpha$1) may include methylpolyethylene glycol allyl ether, vinyl acetate, styrene, and isobutylene.

Compounds which are mentioned as crosslinking agents (α3) in WO 2004/037903 A2 may be used as crosslinking agents (α3). These crosslinking agents include water-soluble crosslinking agents. In this context, N,N'-methylenebisacrylamide, polyethylene glycol di(meth)acrylates, triallylmethylammonium chloride, tetraallylammonium chloride, and allylnonaethylene glycol acrylate prepared with 9 mol of ethylene oxide per mol of acrylic acid may be used.

The polymer structures may comprise as water-soluble polymers (α4) water-soluble polymers such as partly or completely hydrolyzed polyvinyl alcohol, polyvinylpyrrolidone, starch or starch derivatives, polyglycols, or polyacrylic acid, which may be in a polymerized-in form. The molecular weight of these polymers is not critical, as long as they are water-soluble. Water-soluble polymers may include starch or starch derivatives, or polyvinyl alcohol. The water-soluble polymers, such as synthetic polymers, such as polyvinyl alcohol, may also serve as a graft base for the monomers to be polymerized.

Auxiliaries (α6) which are contained in the polymer structures may include standardizing agents, odor-binding agents, surface-active agents, or antioxidants and those additives which have been employed for the preparation of the polymer structures (initiators etc.).

The water-absorbing polymer structures of this invention may be based to the extent of at least about 50 wt %, or at least about 70 wt %, or at least about 90 wt % on monomers carrying carboxylate groups. Component (α1) may comprise to the extent of at least about 50 wt %, or at least 70 wt %, acrylic acid, which may be neutralized to the extent of at least about 20 mol %, or to the extent of at least about 50 mol %, or in a range of from about 60 to about 85 mol %.

The water-absorbing polymer structures contained in the superabsorber composition according to the invention furthermore are surface-modified, or at least post-crosslinked on the surface. Due to the surface post-crosslinking, the outer region of the polymer structures has a higher degree of crosslinking than the inner regions, so that a core-shell structure forms.

The superabsorber composition according to the invention may comprise as water-absorbing polymer structures those polymers which are obtained by a process comprising the process steps:
a) free-radical polymerization of ethylenically unsaturated, optionally partly neutralized monomers carrying acid groups in the presence of a crosslinking agent to form a gel-like polymer structure;
b) optionally comminution of the gel-like polymer structure;
c) drying of the optionally comminuted gel-like polymer structure to obtain water-absorbing polymer structures;
d) optionally grinding of the absorbent polymer structure obtained in this way and sieving to a desired particle size fraction;
e) post-crosslinking of the structure surface of the water-absorbing polymer structures obtained in this way, process step e) being carried out before or after process step c), or after process step d).

The free-radical polymerization carried out in process step a) may be carried out in aqueous solution, this aqueous solution containing as the solvent, in addition to water
(α1) the ethylenically unsaturated monomers carrying acid groups, or salts thereof, acrylic acid may be used as the monomer carrying acid groups,
(α2) optionally monoethylenically unsaturated monomers which may be copolymerized with (α1),
(α3) the crosslinking agent,
(α4) optionally a water-soluble polymer, and
(α6) optionally one or more auxiliaries.

Those compounds that have already been mentioned above in connection with the polymer structures according to the invention as ethylenically unsaturated monomers (α1) carrying acid groups, as monoethylenically unsaturated monomers (α2) that may be copolymerized with (α1), as crosslinking agents (α3), as water-soluble polymers (α4) and as auxiliaries (α6) may be used as ethylenically unsaturated monomers (α1) carrying acid groups, as monoethylenically unsaturated monomers (α2) which may be copolymerized with (α1), as crosslinking agents (α3), as water-soluble polymers (α4) and as auxiliaries (α6).

The water-absorbing polymer structures may be prepared from the above-mentioned monomers, comonomers, crosslinking agents, water-soluble polymers, and auxiliaries by various polymerization methods. Bulk polymerization, may be carried out in kneading reactors, such as extruders, solution polymerization, spray polymerization, inverse emulsion polymerization, and inverse suspension polymerization are to be mentioned as examples in this connection.

The solution polymerization may be carried out in water as the solvent. The solution polymerization may be carried out continuously by polymerization on a belt which conveys the reaction mixture, as disclosed in DE 35 44 770 A1, or discontinuously. A broad spectrum of possibilities of variation in respect of the reaction circumstances, such as temperatures, nature and amount of the initiators and also of the reaction solution, is to be found from the prior art. Typical processes are described in the following patent specifications: U.S. Pat. No. 4,286,082, DE 27 06 135, U.S. Pat. No. 4,076,663, DE 35 03 458, DE 35 44 770, DE 40 20 780, DE 42 44 548, DE 43 23 001, DE 43 33 056, DE 44 18 818.

The polymerization may be initiated by an initiator as is generally conventional. Initiators which may be used for initiation of the polymerization are all the initiators which form free radicals under the polymerization conditions and are conventionally employed in the preparation of superabsorbers. Initiation of the polymerization by the action of electron beams on the polymerizable aqueous mixture is also possible. Nevertheless, the polymerization may also be initiated in the absence of initiators of the abovementioned type by the action of high-energy radiation in the presence of photoinitiators. Polymerization initiators may be contained in a solution of monomers according to the invention in dissolved or dispersed form. Possible initiators are all the compounds known to the person skilled in the art which dissociate into free radicals. These include, in particular, those initiators which have already been mentioned as possible initiators in WO 2004/037903 A2.

A redox system comprising hydrogen peroxide, sodium peroxodisulphate, and ascorbic acid may be employed for preparation of the water-absorbing polymer structures.

Inverse suspension and emulsion polymerization may also be used for preparation of the polymer structures. According to these processes, an aqueous, partly neutralized solution of monomers (α1) and (α2), optionally containing water-soluble polymers (α4) and auxiliaries (α6), is dispersed in a hydrophobic organic solvent with the aid of protective colloids and/or emulsifiers, and the polymerization is started by free radical initiators. The crosslinking agents are either dissolved in the monomer solution and are metered together with this, or are added separately and optionally during the polymerization. The addition of a water-soluble polymer (α4) as a graft base is optionally carried out via the monomer solution or by direct initial introduction into the oily phase. The water is then removed azeotropically from the mixture and the polymer is filtered off.

In the cases of solution polymerization, inverse suspension, and emulsion polymerization, the crosslinking may furthermore be carried out by polymerizing in the polyfunctional crosslinking agent dissolved in the monomer solution and/or by reaction of suitable crosslinking agents with functional groups of the polymer during the polymerization steps. The processes are described, for example, in the publications U.S. Pat. No. 4,340,706, DE 37 13 601, DE 28 40 010 and WO 96/05234 A1 which are incorporated by reference only to the extent of the disclosure directed to crosslinking as set forth above.

The gel-like polymer structures obtained in the solution polymerization or the inverse suspension and emulsion polymerization in process step a) may be dried in process step c).

In the case of solution polymerization in particular, however, it is preferable for the gel-like polymer structures first to be comminuted in an additional process step b) before the drying. This comminution is carried out by comminution devices known to the person skilled in the art, such as a chopper (cf. DE 195 18 645 C1) or, for example, a mincing machine, which may be installed downstream of the chopper.

Drying of the gel-like polymer structure may be carried out in suitable dryers or ovens. Rotary tube ovens, fluidized bed dryers, plate dryers, paddle dryers or infrared dryers may be mentioned by way of example. The drying of the hydrogel in process step c) may be carried out down to a water content of from about 0.5 to about 25 wt %, or from about from about 1 to about 10 wt %, the drying temperatures conventionally being in a range of from about 100 to about 200° C.

The dried water-absorbing polymer structures obtained in process step c) may be ground again in a further process step d), especially if they have been obtained by solution polymerization, and sieved to the abovementioned desired particle size. Grinding of the dried water-absorbing polymer structures may be carried out in suitable mechanical comminution devices, such as, for example, a ball mill.

The gel-like polymer structure obtained in process step a), the comminuted gel-like polymer structure obtained in process step b), the dried polymer structure obtained in process step c) or the ground dried polymer structure obtained in process step d), or the ground dried polymer structure obtained in process step d), may be modified, or at least post-crosslinked, in the region of the structure surface in a further process step e). In this context, the structure surface of the gel-like or dried polymer structure, but of the ground dried polymer structure may be brought into contact with an organic, chemical surface post-crosslinking agent.

The post-crosslinking agent, especially if it is not liquid under the post-crosslinking conditions, may be brought into contact with the structure surface of the polymer structure via a solvent. In this context, solvents which are employed may be water, water-miscible organic solvents, such as, for example, methanol, ethanol, 1-propanol, 2-propanol or 1-butanol, or mixtures of at least two of these solvents, wherein water may be used. The solvent or solvent mixture may contain the post-crosslinking agent in an amount in a range of from about 5 to about 75 wt. %, or from about 10 to about 50 wt %, or from about 15 to about 40 wt %, based on the total weight of the solvent or solvent mixture.

The structure surface of the polymer structure may be brought into contact with the solvent or the solvent mixture containing the post-crosslinking agent by thorough mixing of the solvent or solvent mixture with the polymer structure. Suitable mixing units for the mixing include for example the Patterson-Kelley mixer, DRAIS turbulence mixer, Lödige mixer, Ruberg mixer, screw mixers, plate mixers, fluidized bed mixers, and continuously operating vertical mixers, in which the polymer structure is mixed by means of rotating blades in rapid frequency (Schugi mixer).

During the post-crosslinking, the polymer structure may be brought into contact with at most about 20 wt %, or about 15 wt. %, or about 10 wt %, or about 5 wt. % of a solvent such as water.

In the case of polymer structures in the form of approximately spherical particles, the components may be brought into contact merely by bringing the structure surface, but not the inner region of the particulate polymer structure, into contact with the solvent, or the solvent mixture and thus with the post-crosslinking agent.

Compounds which have two functional groups or more that may react with functional groups of a polymer structure in a condensation reaction, referred herein as condensation crosslinking agents, in an addition reaction or in a ring-opening reaction may be employed as post-crosslinking agents with which the polymer structures may be post-crosslinked. Those post-crosslinking agents which have been mentioned as crosslinking agents of crosslinking agent class II in WO 2004/037903 A2 are preferred as post-crosslinking agents in the process according to the invention.

These compounds include diethylene glycol, triethylene glycol, polyethylene glycol, glycerol, polyglycerol, propylene glycol, diethanolamine, triethanolamine, polyoxypropylene, oxyethylene-oxypropylene block copolymers, sorbitan fatty acid esters, polyoxyethylene sorbitan fatty acid esters, trimethylolpropane, pentaerythritol, polyvinyl alcohol, sorbitol, 1,3-dioxolan-2-one (ethylene carbonate), 4-methyl-1,3-dioxolan-2-one (propylene carbonate), 4,5-dimethyl-1,3-dioxolan-2-one, 4,4-dimethyl-1,3-dioxolan-2-one, 4-ethyl-1,3-dioxolan-2-one, 4-hydroxymethyl-1,3-dioxolan-2-one, 1,3-dioxan-2-one, 4-methyl-1,3-dioxan-2-one and 4,6-dimethyl-1,3-dioxan-2-one, and wherein 1,3-dioxolan-2-one may be used.

After the polymer structures have been brought into contact with the post-crosslinking agent, or with the fluid containing the post-crosslinking agent, they are heated to a temperature in a range of from about 50 to about 300° C., or from about 75 to about 275° C., or from about 150 to about 250° C., so that the structure surface may be more highly crosslinked compared with the inner region of the polymer structure, post-crosslinking. The duration of the heat treatment is generally limited by the risk that the desired profile of properties of the polymer structures is destroyed as a result of the action of heat.

The fine particle partly immobilized on the structure surface may be an organic or an inorganic fine particle, or an inorganic fine particle.

The fine particles may furthermore be water-soluble fine particles, water-soluble fine particles being understood to mean fine particles of which at least about 1 g, or at least about 5 g, or at least about 10 g may be dissolved in 100 ml of water at 25° C.

The fine particles may be water-insoluble fine particles such as water-insoluble fine particles, wherein it is understood as meaning fine particles of which less than about 1 g, or less than about 0.1 g, or less than about 0.01 g may be dissolved in 100 ml of water at 25° C.

The inorganic fine particle may contain a divalent, or a trivalent metal. Such metals that are at least divalent may include beryllium, magnesium, calcium, barium, strontium, aluminum, boron, zirconium, silicon, smaydium, vanadium, cerium, yttrium, lanthanum, niobium, chromium, molybdenum, manganese, palladium, platinum, cadmium, mercury, iron, copper, zinc, titanium, cobalt or nickel, wherein aluminum may be used.

The inorganic fine particle may be in the form of a salt including the at least divalent metal in the form of an at least divalent cation $K^{n+}$ (where n≥2) and at least one anoint $A^{m-}$ (where m≥1).

Fine particles may be selected from aluminum salts, such as, for example, aluminum chloride, polyaluminium chloride, aluminum sulphate, aluminum nitrate, aluminum potassium bis-sulphate, aluminum sodium bis-sulphate, aluminum lactate, aluminum oxalate, aluminum citrate, aluminum glyoxylate, aluminum succinate, aluminum itaconate, aluminum crotonate, aluminum butyrate, aluminum sorbate, aluminum malonate, aluminum benzoate, aluminum tartrate, aluminum pyruvate, aluminum valerate, aluminum formate, aluminum glutarate, aluminum propanoate or aluminum acetate, phosphates of the formula $M_4P_2O_7$, $M_2HPO_4$ or $M_3PO_4$, wherein M represents one equivalent of a metal chosen from calcium, magnesium, strontium, barium, zinc, iron, aluminum, titanium, zirconium, hafnium, tin, cerium, yttrium, or lanthanum, or mixtures thereof, such as, for example, calcium hydrogen phosphate, tertiary calcium phosphate, apatite, Thomas meal of the formula $Ca_5(PO_4)[SiO_4]$, berlinite of the formula $AlPO_4$ or rhenania phosphate of the formula 3 $MayaPO_4Ca_2SiO_4$, calcium chloride, calcium nitrate, magnesium chloride, magnesium sulphate, magnesium nitrate, zinc chloride, zinc sulphate, zinc nitrate, copper sulphate, cobalt chloride, zirconium chloride, zirconium sulphate, zirconium nitrate; silicon dioxides, in particular pyrogenic silica, such as is obtainable, for example, under the trade name Aerosil®, or precipitated silicas, such as are commercially obtainable under the name Sipernat®, titanium dioxides, zinc oxide, aluminum hydroxide, aluminum acetylacetonate, zirconium acetylacetonate, tin oxide and mixed oxides between zinc, aluminum, titanium, zirconium, tin and/or silicon, such as aluminum titanate, aluminum titanium oxide and zinc titanium oxide.

These fine particles may include aluminum salts selected from $AlCl_3 \times 6H_2O$, $NaAl(SO_4)_2 \times 12\ H_2O$, $KAl(SO_4)_2 \times 12\ H_2O$, $Al_2(SO_4)_3 \times 14\text{-}18\ H_2O$, aluminum lactate or aluminum citrate, $Al_2(SO_4)_3 \times 14\text{-}18\ H_2O$ moreover being particularly preferred. Al(O)OH, which is interpreted as an aluminum salt, may be used.

The composition may comprise at least two different types of fine particles, for example an aluminum salt and a salt which differs from an aluminum salt, or two different aluminum salts.

At least about 50 wt %, or at least about 75 wt %, or at least about 95 wt %, or at least about 99 wt % of the fine particles may have an average particle diameter (weight-average) in a range of from about 10 to about 1,000 µm, or from about 50 µm to about 800 µm, or from about 100 to about 600 µm, or from about 200 to about 400 µm, in each case determined by methods of particle size determination known to the person skilled in the art, or by sieve analysis or by means of a Coulter counter.

The content of fine particles having an average particles size greater than 150 µm is more than about 20 wt %, or more than about 30 wt %, or more than about 40 wt %, in each case based on the total weight of the fine particles.

The fine particles may be immobilized on the structure surface via a binder. The binder may comprise a main binder component water and/or an organic compound, the organic compound being a solid at about 20° C.

The organic compound may be a linear polymer, or a linear polymer selected from polyurethanes, polyesters, polyamides, polyester-amides, polyolefins, polyvinyl esters, polyethers, polystyrenes, polyimides, in particular polyether-imides, polyimines, sulphur polymers, in particular polysulphone, polyacetals, in particular polyoxymethylenes, fluorinated plastics, polyvinylidene fluoride, styrene/olefin copolymers, polyacrylates, ethylene/vinyl acetate copolymers or mixtures of two or more of the polymers mentioned, among these polymers polycondensates, and wherein these polyethers may be used, or linear polyethers may be used.

Suitable linear polyethers may include polyalkylene glycols such as glycols, polypropylene glycols, poly(ethylene/propylene) glycols with a statistical or block-like arrangement of the ethylene or propylene monomers, or mixtures of at least two of these polyalkylene glycols.

Linear polymers may be those polymers which are mentioned as "thermoplastic adhesives" in DE-A-103 34 286. The disclosure content of DE-A-103 34 286 in respect of thermoplastic adhesives is introduced herewith as reference and forms part of the disclosure of the present invention.

The organic compound as the main binder component may have a weight-average molecular weight $M_w$ in a range of from about 100 to about 1,000,000 g/mol, or from about 1,000 to about 100,000 g/mol, or from about 5,000 to about 20,000 g/mol.

In another embodiment, the superabsorber composition, at least about 25 wt %, or at least about 50 wt %, or at least about 75 wt %, or at least about 95 wt %, or at least about 99 wt %, in each case based on the total weight of the fine particles, of the majority of the fine particles to be combined with one another to form a fine particle agglomerate, a fine particle agglomerate may comprise at least two fine particles agglomerated with one another. In this context, on the one hand the fine particles may be joined to one another at least partly via the binder to obtain fine particle agglomerates, and on the other hand the fine particles or fine particle agglomerates are joined to the structure surface via the binder.

At least about 25 wt. %, or at least about 50 wt %, or at least about 75 wt % of the structure surface of the water-absorbing polymer structures in the superabsorber composition according to the invention may be free from binder.

The amount of fine particles may be in a range of from about 0.001 to about 10 wt %, or in a range of from about 0.01 to about 5 wt %, or in a range of from about 0.1 to about 2 wt %, in each case based on the weight of the water-absorbing polymer structures, while the weight of the binder may be from about 0.0001 to about 5 wt %, or from about 0.001 to about 2 wt %, in each case based on the weight of the water-absorbing polymer structure.

The weight ratio between fine particles and binder may be in a range of fine particles binder of from about 20:1 to about 1:20, or from about 10:1 to about 1:10, or from about 10:1 to about 2:1.

The superabsorber composition according to the invention furthermore may be characterized by at least one of the following properties:

(β1) an AAP value, determined in accordance with ERT 442.2-02 under a pressure of 0.3 psi, of at least about 15 g/g, or at least about 20 g/g, or at least about 25 g/g;

(β2) an AAP value, determined in accordance with ERT 442.2-02 under a pressure of 0.7 psi, of at least about 12 g/g, or at least about 15 g/g, or at least about 20 g/g;

(β3) an SFC value, determined in accordance with the test method described herein, of at least about $110 \times 10^{-7}$ cm$^3$s/g, or at least about $130 \times 10^{-7}$ cm$^3$s/g, at a CRC value, determined in accordance with ERT 441.2-02, of greater than greater than 20 g/g to less than or equal to 22 g/g;

(β4) an SFC value, determined in accordance with the test method described herein, of at least about $90 \times 10^{-7}$ cm$^3$s/g, or of at least about $110 \times 10^{-7}$ cm$^3$s/g, at a CRC value, determined in accordance with ERT 441.2-02, of greater than 22 g/g to less than or equal to 24 g/g;

(β5) an SFC value, determined in accordance with the test method described herein, of at least about $70 \times 10^{-7}$ cm$^3$s/g, or of at least about $90 \times 10^{-7}$ cm$^3$s/g, at a CRC value, determined in accordance with ERT 441.2-02, of greater than 24 g/g to less than or equal to 26 g/g;

(β6) an SFC value, determined in accordance with the test method described herein, of at least about $50 \times 10^{-7}$ cm$^3$s/g, or of at least about $70 \times 10^{-7}$ cm$^3$s/g, at a CRC value, determined in accordance with ERT 441.2-02, of greater than 26 g/g to less than or equal to 28 g/g;

(β7) an SFC value, determined in accordance with the test method described herein, of at least about $30 \times 10^{-7}$ cm$^3$s/g, or of at least about $50 \times 10^{-7}$ cm$^3$s/g, at a CRC value, determined in accordance with ERT 441.2-02, of greater than 28 g/g to less than or equal to 30 g/g;

(β8) an SFC value, determined in accordance with the test method described herein, of at least about $10 \times 10^{-7}$ cm$^3$s/g, or of at least about $30 \times 10^{-7}$ cm$^3$s/g, at a CRC value, determined in accordance with ERT 441.2-02, of greater than 30 g/g.

Embodiments of the superabsorber composition according to the invention which are furthermore preferred have any conceivable combination of the above features (β1) to (β8), the embodiments of the following combinations of features being preferred: (β1), (β2), (β3), (β4), (β5), (β6), (β7), (β1)(β3)(β4)(β5)(β6)(β7)(β8) and (β1)(β2)(β3)(β4)(β5)(β6)(β7)(β8), (β1)(β2)(β3)(β4)(β5)(β6)(β7)(β8) being the most preferred combinations of properties.

A contribution towards achieving the abovementioned objects is also made by a process for the preparation of a superabsorber composition, comprising as process steps
i) providing a surface-crosslinked, water-absorbing polymer structure having a structure surface;
ii) providing a fine particle component comprising a large number of fine particles,
iii) mixing of the fine particle component comprising a large number of fine particles with the water-absorbing polymer structure; and
iv) immobilizing of at least some of the fine particles on the structure surface.

In this context, those polymer structures that have been described above in connection with the superabsorber composition according to the invention may be the water-absorbing polymer structure post-crosslinked on the surface provided in process step i). According to a particular embodiment of the process according to the invention, a polymer structure which has been obtained in step d) of the process described above for the preparation of water-absorbing polymer structures, where this polymer structure has been brought into contact with a post-crosslinking agent solution but has not yet been heated to the post-crosslinking temperature required for a post-crosslinking, is provided in process step i) as the water-absorbing polymer structure post-crosslinked on the surface. In this case, the process step includes provision of a water-absorbing polymer structure which is not (yet) post-crosslinked on the surface.

Those fine particles which have already been mentioned above in connection with the superabsorber composition according to the invention are likewise as the fine particles which are contained in the fine particle component provided in process step ii). The amount of fine particles employed may be from about 0.001 to about 10 wt %, or from about 0.01 to about 5 wt %, or from about 0.1 to about 2 wt %, in each case based on the weight of the water-absorbing polymer structures.

According to another embodiment of the process according to the invention, the fine particle component additionally may comprise a binder, those binders that have already been mentioned above in connection with the superabsorber composition. These particulate binders may be selected from polyalkylene glycols, such as, for example, particulate polyethylene glycols or polypropylene glycols, wherein the particulate binder may be based to the extent of at least about 50 wt. %, or at least about 75 wt %, or at least about 95 wt %, or at least about 99 wt % on particles having an average particle diameter (weight-average) of less than about 500 μm, or less than about 400 μm, or less than about 300 μm, or less than about 150 μm, in each case determined by methods of particle size determination known to the person skilled in the art, or by sieve analysis or by means of a Coulter counter.

The process according to another embodiment includes, in addition to provision of the water-absorbing polymer structures in process step i), the provision of a fine particle component in process step ii) by mixing of a particulate binder with the fine particle, or by mixing of a particulate polyalkylene glycol with a particulate aluminum salt. The weight ratio between the fine particles and the particulate binder may be in a range of fine particles: binder of from about 20:1 to about 1:20, or from about 10:1 to about 1:10, or from about 10:1 to about 2:1.

The mixing of the fine particles with the particulate binder to obtain the fine particle component may be carried out by means of all the mixing devices known to the person skilled in the art, suitable mixing units including e.g. a Patterson-Kelley mixer, a DRAIS turbulence mixer, a Lödige mixer, a Ruberg mixer, a screw mixer, a plate mixer, a fluidized bed mixer and continuously operating vertical mixers, in which the polymer structure is mixed by means of rotating blades in rapid frequency (Schugi mixer).

In process step iii), the fine particle component provided in process step ii) may be mixed with the water-absorbing polymer structures post-crosslinked on the surface provided in process step i), it being possible for the abovementioned mixing devices in turn to be employed.

After or during the mixing in process step iii), at least some of the fine particles are immobilized on the structure surface in process step iv), such as by heating. In this context, the immobilizing may be carried out by heating to a temperature that is at most about 10%, or at most about 7.5%, or at most about 5% above the softening temperature of a constituent of the fine particle component, or above the softening temperature of the binder. The heating may be carried out at a temperature in a range of from about 30 to about 200° C., or from about 50 to about 160° C., or from about 50 to about 160° C., or from about 100 to about 140° C. If a water-absorbing polymer structure that has indeed already been brought into contact with a post-crosslinking agent solution but has not yet been heated to the post-crosslinking temperature required for a post-crosslinking has been provided in process step i), it may be advantageous if a higher temperature, for example a temperature of from about 100 to about 250° C., or from about 120 to about 200° C., to be maintained during the heating.

In this context, at least four procedures are in principle conceivable:
According to variant $V_A$, the mixture of fine particle component and water-absorbing polymer structure is first prepared in process step iii) and this is then heated to the abovementioned temperature for the purpose of immobilizing the fine particles, it being possible for the water-absorbing polymer structure already to be post-crosslinked on the surface, or the water-absorbing polymer structure having indeed already been brought into contact with the post-crosslinking agent, but not yet having been heated to a temperature required for a surface post-crosslinking.

According to variant $V_B$, the water-absorbing polymer structures are first heated, before process step iii), to the temperature described above and these preheated water-absorbing polymer structures are then mixed with the non-preheated fine particle component in process step iii).

According to variant $V_C$, the water-absorbing polymer structures and the fine particle component are first heated separately, before process step iii), in each case to the temperature described above and the preheated water-absorbing polymer structures are then mixed with the fine particle component, which is likewise preheated, in process step iii). According to a particular embodiment of this variant $V_C$, it is preferable first to cool the fine particle component after the heating and before the mixing with the preheated water-absorbing polymer structures, or to a temperature of from about 10 to about 100° C., or from about 15 to about 75° C., or from about 20 to about 60° C., thereafter optionally to comminute it, for example by means of a mortar, and then to mix the cooled and optionally comminuted fine particle component with the preheated water-absorbing polymer structures.

According to variant $V_D$, the fine particle component is first heated, before process step iii), to the temperature described above and the preheated fine particle component is then mixed with the non-preheated water-absorbing polymer structures in process step iii). According to a particular embodiment of this variant $V_D$, it is preferable first to cool the fine particle component after the heating and before the mixing with the non-preheated water-absorbing polymer structures, to a temperature of from about 10 to about 100° C., or from about 15 to about 75° C., or from about 20 to about 60° C., thereafter optionally to comminute it, for example by means of a mortar, and then to mix the cooled and optionally comminuted fine particle component with the non-preheated water-absorbing polymer structures.

In this context, the wording "non-preheated" means that the temperature of the particular component is less than about 100° C., or less than about 80° C., or less than about 40° C.

The duration of the heating may be in a range of from about 10 seconds to about 60 minutes, or from about 30 seconds to about 30 minutes, depending on the mixing speed and the mixing device used.

It may furthermore be advantageous if process step iv) is also followed by a further process step v), in which the superabsorber composition is mixed further for a period of from about 10 minutes to about 5 hours, or from about 30 minutes to about 3 hours, in order to render possible as homogeneous a distribution as possible of the fine particles or the fine particle agglomerates and the absorbent polymer structures, it being possible for mixing devices known to the person skilled in the art to be employed for this purpose. In this further process step, the superabsorber composition may be introduced into the mixer at the temperature which it has after the immobilizing in process step iv), it being possible for the superabsorber composition then to be cooled in the course of the mixing to a lower temperature, such as room temperature.

A contribution towards achieving the abovementioned objects is also made by a superabsorber composition obtainable by the process described above. This superabsorber composition may be characterized by the absorption properties described in connection with the superabsorber composition according to the invention described above by the AAP values, SFC values, and CRC values stated herein.

According to one embodiment according to the invention of the superabsorber composition according to the invention and of the process according to the invention, the values of features according to the invention stated with only a lower limit to have an upper limit which is about 20 times, or about 10 times, or about 5 times the value of the lower limit.

A further contribution towards achieving the objects described above is made by a composite comprising the superabsorber composition according to the invention or the superabsorber composition obtainable by the process according to the invention and a substrate. In this context, the superabsorber composition and the substrate are firmly joined to one another. Substrates may include films of polymers, such as, for example, of polyethylene, polypropylene or polyamide, metals, nonwovens, fluff, tissues, woven fabric, natural or synthetic fibers or other foams. The composite may include at least one region that comprises the superabsorber composition according to the invention in an amount of from about 15 to 100 wt %, or from about 30 to 100 wt %, or from about 50 to 99.99 wt. %, or from about 60 to 99.99 wt. %, or from about 70 to 99 wt. %, in each case based on the total weight of the region in question in the composite, this region preferably having a size of at least about 0.01 cm$^3$, or at least about 0.1 cm$^3$ or at least about 0.5 cm$^3$.

An embodiment of the composite according to the invention includes a planar composite, such as is described as absorbent material in WO-A-02/056812. The disclosure content of WO-A-02/056812, in respect only of the precise build-up of the composite, of the weight per unit area of its constituents and of its thickness, is introduced herewith as reference and represents part of the disclosure of the present invention.

A further contribution towards achieving the abovementioned objects is made by a process for the production of a composite, the superabsorber composition according to the invention or the superabsorber composition obtainable by the process according to the invention and a substrate and optionally an additive being brought into contact with one another. Those substrates which have already been mentioned above in connection with the composite according to the invention may be employed as substrates.

According to a particular embodiment of the process according to the invention for the production of a composite, this process may include the following process steps:
I) providing a substrate;
II) providing a surface-crosslinked, water-absorbing polymer structure having a structure surface;
III) providing a fine particle component comprising a large number of fine particles;
IV) bringing the substrate into contact with the at least surface-crosslinked, water-absorbing polymer structure;
V) bringing the at least surface-crosslinked, water-absorbing polymer structure into contact with the fine particle component; and
VI) immobilizing at least some of the fine particles on the structure surface.

In this context, that fine particle component that has already been described above as the fine particle component in connection with the process according to the invention for the preparation of a superabsorber composition may be used as the fine particle component.

According to one variant of this preferred embodiment of the process according to the invention for the production of a composite, the substrate, and the polymer structure post-crosslinked on the surface may be first brought into contact with one another, such as by first taking the substrate and then applying, or scattering on, either uniformly or to certain areas, the polymer structure post-crosslinked on the surface. The water-absorbing polymer structures on the substrate surface may then be subsequently brought into contact with the fine particle component, for example by scattering the fine particle component on to the polymer structure post-crosslinked on the surface that is on the substrate surface. Finally, immobilizing of the fine particle component on the structure surface may be carried out, this immobilizing being carried out by the heating described above in connection with the process according to the invention for the preparation of the superabsorber composition. In this variant of the particular embodiment of the process according to the invention for the production of a composite, process step V) is consequently carried out after process step IV).

According to another variant of this particular embodiment of the process according to the invention for the production of a composite, the substrate is first taken. The polymer structure post-crosslinked on the surface may then be brought into contact with the substrate, by first taking the substrate and then applying, or scattering, either uniformly or to certain areas of the substrate surface, the polymer structure post-crosslinked on the surface. Before the polymer structure is yet brought into contact with the substrate surface, the water-absorbing polymer structures may be brought into contact with the fine particle component, for example by mixing the fine particle component with the polymer structure post-crosslinked on the surface, before it is scattered on the substrate surface. After the polymer structures have been brought into contact with the substrate, the immobilizing of the fine particle component on the structure surface may then be carried out. In this variant of the particular embodiment of the process according to the invention for the production of a composite, process step V) is consequently carried out before process step IV).

A contribution towards achieving the abovementioned objects is also made by a composite obtainable by the process described above, this composite having the same properties as the composite according to the invention described above.

A further contribution towards achieving the abovementioned objects is made by chemical products comprising the superabsorber composition according to the invention or a composite according to the invention. Chemical products may include foams, shaped articles, fibers, foils, films, cables, sealing materials, liquid-absorbing hygiene articles, diapers, and sanitary towels, carriers for plant or fungal growth-regulating compositions or plant protection active substances, additives for building materials, packaging materials, or soil additives.

The use of the superabsorber composition according to the invention or of the composite according to the invention in chemical products, such as diapers or sanitary towels, and the use of the superabsorber particles as carriers for plant or fungal growth-regulating compositions or plant protection active substances also make a contribution towards achieving the abovementioned objects. In the case of the use as carriers for plant or fungal growth-regulating compositions or plant protection active substances, it is preferable for the plant or fungal growth-regulating compositions or plant protection active substances to be able to be released over a period of time which may be controlled by the carrier.

The invention will now be explained in more detail with the aid of test methods and non-limiting examples.

TEST METHODS

Determination of the SFC Value

The permeability in the swollen state (saline flow conductivity=SFC) is determined by a method described in WO-A-95/22356. Approx. 0.9 g of superabsorber material (the total particle fraction) is weighed into a cylinder with a sieve base and distributed carefully over the sieve area. The superabsorber material is allowed to swell in JAYCO synthetic urine for 1 hour against a pressure of 20 g/cm². After the swollen height of the superabsorber has been recorded, 0.118 M NaCl solution is allowed to run from a levelled reservoir vessel through the swollen gel layer under a constant hydrostatic pressure. During the measurement, the swollen gel layer is covered with a special sieve cylinder which ensures uniform distribution of the 0.118 M NaCl solution above the gel and constant conditions (measuring temperature 20-25° C.) during the measurement in respect of the nature of the gel bed. The pressure acting on the swollen superabsorber continues to be 20 g/cm². The amount of liquid passing through the gel layer as a function of time is recorded with the aid of a computer and a balance at intervals of 20 seconds within a period of 10 minutes. The flow rate g/s through the swollen gel layer is determined by means of regression analysis with extrapolation of the gradient and determination of the midpoint at time t=0 of the flow within minutes 2-10. The SFC value (K) was stated in $cm^3 \cdot s \cdot g^{-1}$ and calculated as follows:

$$K = \frac{F_s(t=0) \cdot L_0}{r \cdot A \cdot \Delta P_1} = \frac{F_S(t=0) \cdot L_0}{139506}$$

wherein $F_s(t=0)$ is the flow rate in g/s,
$L_0$ is the thickness of the gel layer in cm,
r is the density of the NaCl solution (1.003 g/cm³),
A is the area of the upper side of the gel layer in the measuring cylinder (28.27 cm²),
ΔP is the hydrostatic pressure loading the gel layer (4,920 dyne/cm²), and
K is the SFC value.

EXAMPLES

1. Preparation of a Polymer Structure Post-Crosslinked on the Surface

A monomer solution consisting of 300.0 g acrylic acid, 233.11 g NaOH (50% strength), 442.75 g deionized water, 1.180 g monoallylpolyethylene glycol-750 monoacrylic acid ester and 0.577 g polyethylene glycol-300 diacrylate was freed from dissolved oxygen by flushing with nitrogen and cooled to the start temperature of 4° C. After the start temperature was reached, the initiator solution (0.3 g sodium peroxydisulphate in 10.0 g H₂O, 0.07 g 35% strength hydrogen peroxide solution in 10.0 g H₂O and 0.015 g ascorbic acid in 2.0 g H₂O) was added. After the end temperature of about 86° C. was reached, the gel formed was comminuted and dried at 150° C. for 120 minutes. The dried polymer was coarsely crushed, ground to a particle size of less than 2,000 μm in an SM100 cutting mill and sieved to a powder having a particle size of from 150 to 850 μm.

100 g of the polymer particles obtained in this manner were mixed in a laboratory mixer with a total of 4 g of an aqueous solution consisting of 1 g ethylene carbonate and 3 g water, and the mixture was then heated at 180° C. in an oven for a period of 30 minutes.

The AAP value under a pressure of 0.7 psi, the CRC value and the SFC value of this water-absorbing polymer structure were determined (see the results in Table 1).

2. Immobilizing of Fine Particles 100 g of the polymer obtained in Preparation Example 1 were preheated at 130° C. in a drying cabinet.

A mixture of 10 g $Al_2(SO_4)_3 \times 14H_2O$, which was ground in a centrifugal mill and sieved to a particle size in a range of from 300 to 400 μm, and 1.5 g polyethylene glycol 10,000 (polyethylene glycol having a molecular weight of 10,000 g/mol), which was likewise ground in a centrifugal mill and sieved to a particle size of less than 300 μm, was prepared. 1.15 g of the mixture of $Al_2(SO_4)_3 \times 14H_2O$ and polyethylene glycol 10,000 were mixed with the preheated water-absorbing polymer structure in a Krups mixer, while stirring.

The AAP value under a pressure of 0.7 psi, the CRC value and the SFC value of this superabsorber composition according to the invention were likewise determined (see the results in Table 1).

TABLE 1

| Example | SFC [cm³s/g] | AAP (0.7 psi) [g/g] | CRC [g/g] |
|---|---|---|---|
| 1 (not according to the invention) | $44 \times 10^{-7}$ | 25.9 | 29.3 |
| 2 | $83 \times 10^{-7}$ | 22.3 | 31.3 |

The invention claimed is:

1. A superabsorber composition consisting of:
   a) a surface-crosslinked, water-absorbing polymer structure having a structure surface,
   b) from about 0.01 to about 5 wt % based on the weight of the water-absorbing polymer structures of a solid powder selected from aluminium salts having an average particle diameter in the range of from about 100 to about 600 μm wherein the solid powder is at least partly immobilized on the structure surface of the surface-crosslinked, water-absorbing polymer; and
   c) a binder selected from polypropylene glycols or polyethylene glycols, wherein the binder has a weight-average molecular weight $M_w$ in a range of from about 5,000 to about 1,000,000 g/mol and said binder is a solid at 20° C., wherein the binder immobilizes the solid powder on the structure surface of the surface-crosslinked, water-absorbing polymer; and
   wherein the weight ratio of the solid powder of b) and the binder of c) is from about 10:1 to about 2:1, and wherein the elements b) and c) are applied to the structure surface of the surface-crosslinked, water-absorbing polymer structure, and wherein the solid powder are immobilized by said binder, and wherein the superabsorber composition has an SFC value, determined in accordance with the test method described herein, of from about $50 \times 10^{-7}$ cm³s/g to about $100 \times 10^{-7}$ cm³s/g.

2. The superabsorber composition according to claim 1 wherein said binder is polyethylene glycol.

3. The superabsorber composition according to claim 2 wherein the solid powder consist of at least two different types of solid powder.

4. A product comprising a superabsorber composition according to claim 1.

5. A process for the preparation of a superabsorber composition according to claim 1 consisting of the following process steps:
   i) providing a surface-crosslinked, water-absorbing polymer structure having a structure surface;
   ii) providing a solid powder selected from aluminium salts having an average particle diameter in the range of from about 100 to about 600 μm,
   iii) mixing of the solid powder of ii) with the water-absorbing polymer structure; and
   iv) immobilizing of at least some of the fine particles on the structure surface with a binder selected from polypropylene glycols or polyethylene glycols, wherein the binder has a weight-average molecular weight $M_w$ in a range of from about 5,000 to about 1,000,000 g/mol and said binder and is a solid at 20° C. is a solid at 20° C., wherein the binder immobilizes the solid powder on the structure surface of the surface-crosslinked, water-absorbing polymer;
   wherein the weight ratio of the solid powder of ii) and the binder of iv) is from about 10:1 to about 2:1, and wherein the elements b) and c) are applied to the surface of the surface-crosslinked, water-absorbing polymer structure, wherein the superabsorber composition has an SFC value, determined in accordance with the test method described herein, of from about $50 \times 10^{-7}$ cm³s/g to about $100 \times 10^{-7}$ cm³s/g.

6. The process according to claim 5 wherein the immobilizing is carried out by heating.

7. The process according to claim 5 wherein the immobilizing is carried out by heating to not more than about 10% above the softening temperature of a constituent of the fine particle component.

8. A composition obtained by a process according to claim 5.

9. The composition according to claim 8, wherein the composition is characterized by at least one of the following properties:
   (β1) an AAP value, determined in accordance with ERT 442.2-02 under a pressure of 0.3 psi, of at least about 15 g/g; or
   (β2) an AAP value, determined in accordance with ERT 442.2-02 under a pressure of 0.7 psi, of at least about 12 g/g.

10. A composite comprising a superabsorber composition according to claim 8 and a substrate.

11. A process for the production of a composite comprising a superabsorber composition according to claim 8 and a substrate, wherein the polymer structures and the substrate are brought into contact with one another.

12. The process according to claim 11, comprising the following process steps:
   I) providing the substrate;
   II) providing an at least surface-crosslinked, water-absorbing polymer structure having a structure surface;
   III) providing a solid powder comprising a large number of fine particles;
   IV) bringing the substrate into contact with the surface-crosslinked, water-absorbing polymer structure;
   V) bringing the surface-crosslinked, water-absorbing polymer structure into contact with the fine particle component; and
   VI) immobilizing some of the solid powder on the structure surface.

13. The process according to claim 12, wherein process step V) is carried out after process step IV).

14. The process according to claim 12, wherein process step V) is carried out before process step IV).

15. A composite obtained by a process according to claim 11.

* * * * *